April 16, 1929.  C. FROESCH  1,709,169
GATE PLATE AND CONTROLLER CONSTRUCTION
Filed June 1, 1928
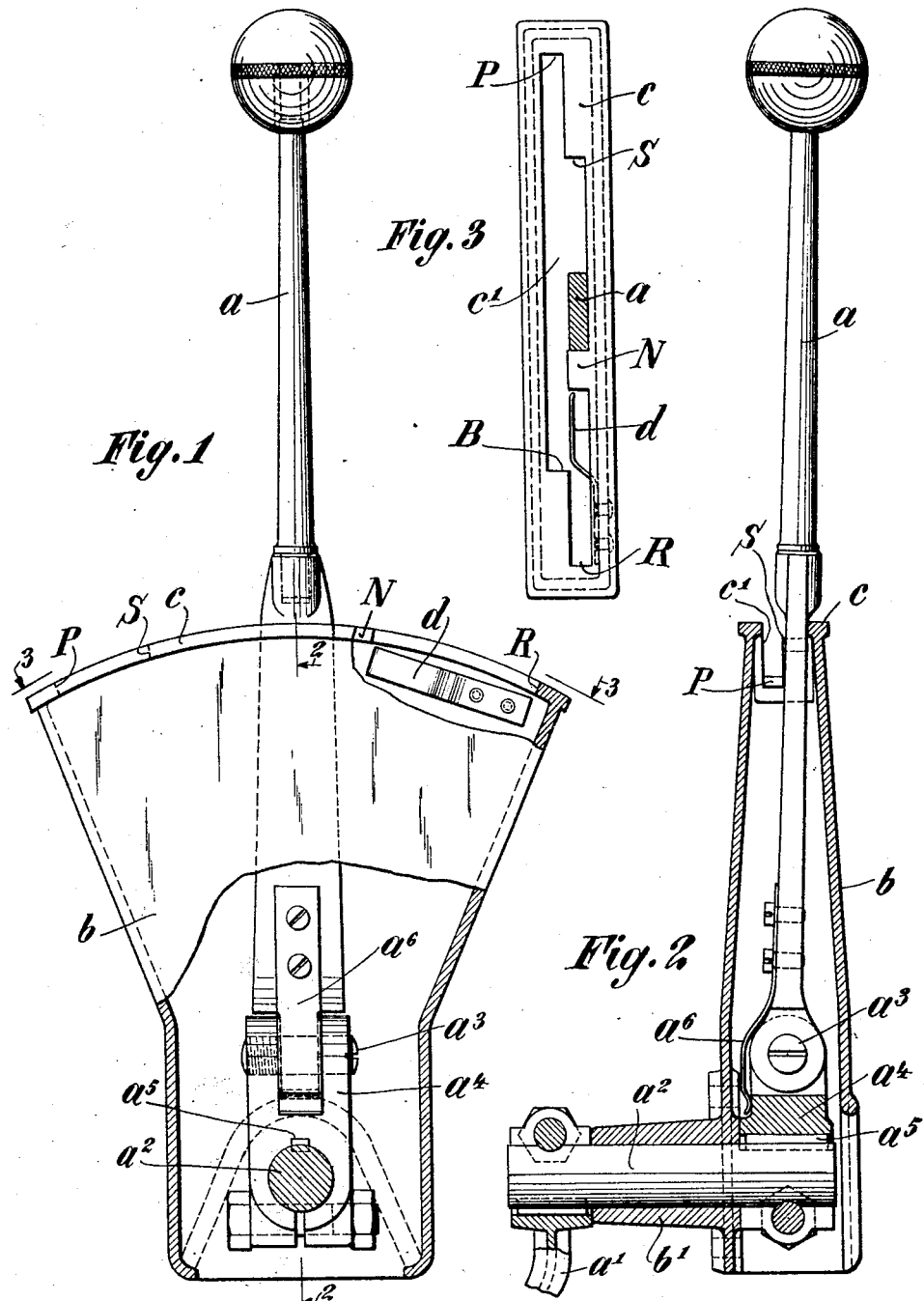
Inventor:
Charles Froesch,
By his attorneys
Redding, Greeley, O'Shea & Campbell Patented Apr. 16, 1929.

1,709,169

UNITED STATES PATENT OFFICE.

CHARLES FROESCH, OF TEANECK, NEW JERSEY, ASSIGNOR TO INTERNATIONAL MOTOR COMPANY, OF NEW YORK, N. Y., A CORPORATION OF DELAWARE.

GATE PLATE AND CONTROLLER CONSTRUCTION.

Application filed June 1, 1928. Serial No. 282,244.

This invention relates to controlling devices for change speed mechanisms of motor vehicles. It is particularly adapted to the motor vehicle change speed mechanisms which include a gasoline electric drive for driving and the construction described and embodied in the present invention comprises a controller handle and gate plate construction which insures a desired speed condition and reduces to a minimum the liability of an improper or inadvertent movement of the controller.

In accordance with the above, an object of the invention is to provide a gate plate construction which receives the control lever and permits it to be moved to a plurality of positions, at the same time preventing accidental or inadvertent movement thereof into incorrect positions. The invention will be understood more fully in connection with the accompanying drawings, wherein:

Figure 1 is a view in side elevation, partly broken away and in section, of the gate plate and controller construction according to the present invention.

Figure 2 is a view in section, taken on line 2—2 of Figure 1, and looking in the direction of the arrows.

Figure 3 is a view in section, taken on line 3—3 of Figure 1, and looking in the direction of the arrows.

Referring to the above drawings, $a$ indicates a control lever for the switch which effects changes in the driving speed of the vehicle through crank arm $a'$ and shaft $a^2$. Lever $a$ is pivotally mounted at $a^3$ to a crank $a^4$ which is keyed to the shaft $a^2$ at $a^5$. Spring $a^6$ normally urges the lever $a$ to the right in Figure 2 and thus causes the shank of the lever to engage the right-hand side of the gate plate as shown in Figure 3.

Housing $b$ is carried upon the vehicle and provided with a bearing $b'$ in which shaft $a^2$ is mounted. The housing is provided with an arcuate gate plate $c$, a slot $c'$ being formed therein to permit movement of the lever $a$. In Figure 3, the lever is indicated in section in the neutral position, at which time the vehicle is at rest. Notch S, formed in the gate plate, represents the series connection of the motors and notch P the parallel connection, these two conditions resulting in a corresponding speed or acceleration for the vehicle. Movement of the lever in the opposite direction can be effected to cause it to engage notch B which represents the braking position or the position in which the motors are connected to exert a braking force upon the axles. For reverse driving, notch R is provided.

It will be seen that the positions represented by notches P and S can be assumed by a simple manipulation of the lever. To assume the braking position, however, a more pronounced conscious effort must be exerted since the lever must be held against the left-hand side of the slot $c'$ in order that it clear the shoulder N which provides the neutral position. In order that the reverse position be assumed only under a most conscious effort in addition to the action of spring $a^6$, a spring $d$ is mounted upon the side of the housing $b$ to resist the movement of the lever $a$ into the notch R. To secure this desired result, spring $d$ must, of course, be stronger than spring $a^6$.

The above construction provides a gate plate which insures braking and reverse driving of the vehicle only under the condition that the operator exerts a considerable conscious and manual effort to assume such positions. It will be seen that the lever cannot accidentally or inadvertently assume either of these positions, and, in this manner, the operation of the vehicle is materially improved.

Although the invention has been described in connection with the accompanying drawings, it is not to be limited, save as defined in the appended claims.

I claim as my invention:

1. A gate plate and controller construction comprising a gate plate, a control lever, a slot in the gate plate for receiving the control lever, a neutral notch in one side of the slot intermediate the ends thereof, spring means to constantly urge the lever against said side, a notch in the said side of the slot at the end thereof, and means, which is stronger than the first named means, to resist movement of the lever into the last named slot.

2. A gate plate and controller construction comprising a gate plate, a control lever, a slot in the gate plate for receiving the control lever, a neutral notch in one side of the slot intermediate the ends thereof, spring means to constantly urge the lever against said side, a notch in the slot at the end thereof, and means, which is stronger than the first named means, to resist movement of the lever into the last named slot, and a notch in the other side of the slot, adjacent the last named notch.

This specification signed this 25th day of May, A. D. 1928.

CHARLES FROESCH.